April 7, 1931.  H. W. GOFF  1,799,686
IMPULSE TRANSMITTER
Filed Jan. 26, 1929   2 Sheets-Sheet 1
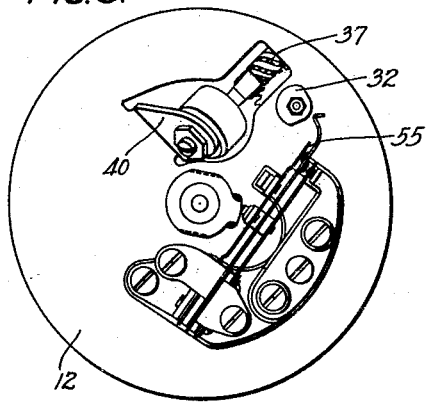
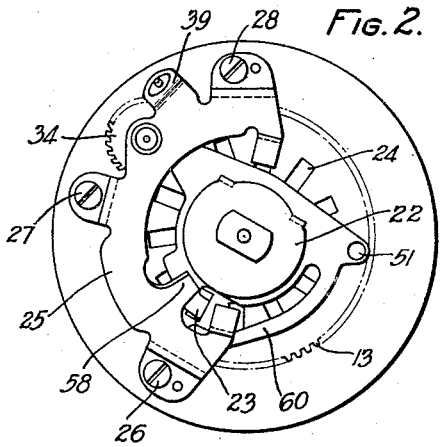
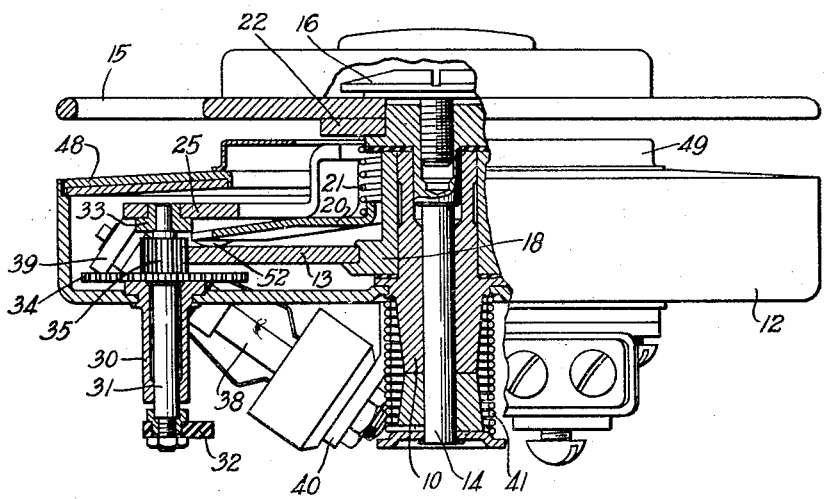
INVENTOR
H. W. GOFF
BY John A Hall
ATTORNEY April 7, 1931.  H. W. GOFF  1,799,686
IMPULSE TRANSMITTER
Filed Jan. 26, 1929   2 Sheets-Sheet 2
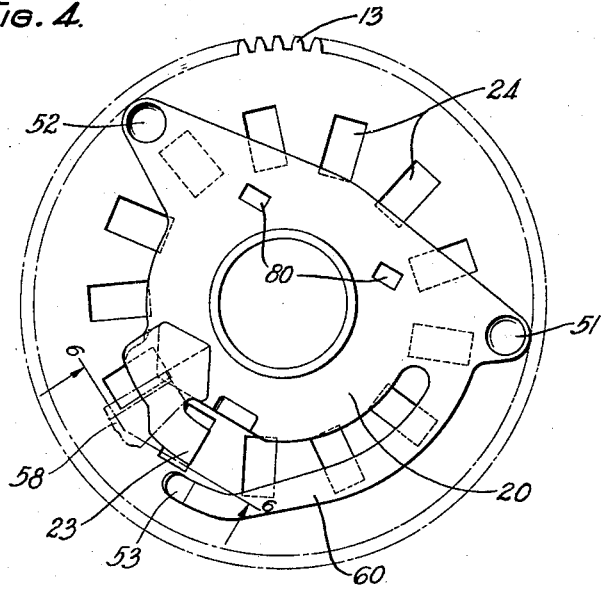
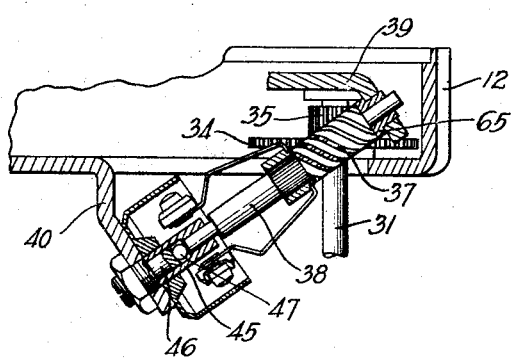
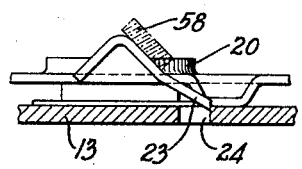
INVENTOR
*H. W. GOFF*
BY
*John A. Hall*
ATTORNEY Patented Apr. 7, 1931

1,799,686

UNITED STATES PATENT OFFICE

HAROLD W. GOFF, OF GREAT NECK, NEW YORK, ASSIGNOR TO BELL TELEPHONE LABORATORIES, INCORPORATED, OF NEW YORK, N. Y., A CORPORATION OF NEW YORK

IMPULSE TRANSMITTER

Application filed January 26, 1929. Serial No. 335,215.

This invention relates to automatic telephone equipment and more particularly to calling dials or impulse transmitters of the type commonly employed in automatic and semi-automatic telephone systems.

The calling dial, as associated with automatic and semi-automatic telephone systems, is a well-known piece of equipment and the functions performed thereby in such systems are equally familiar to those skilled in the art of telephony. The dial used most extensively in the commercial field is appropriately termed a "worm driven" dial by virtue of the fact that a worm and worm wheel mechanism is employed to govern the rotative movement of the finger plate associated with such dials, and consequently, the electrical impulses which control the establishment of automatic telephone connections. It is also well known that the common mechanical practice of driving a worm wheel by a worm is reversed in such a piece of apparatus, so that the worm wheel becomes the motive power for the worm. Due to the very limited space available for the mounting of necessary equipment on such dials, this deviation from the common mechanical practice has presented several difficulties which heretofore, have detracted from the efficiency and uniformity of operation of such dials.

It is the object of this invention to improve the operating efficiency and uniformity of operation of calling dials and at the same time insure a rugged, compact structure.

This object is attained in accordance with a feature of the invention by angularly disposing the axes of the worm and worm wheel shafts; that is, placing the worm shaft at an angle other than the conventional 90 degree angle and approximately at an angle of 45 degrees to the shaft of the worm wheel.

Among the advantages obtained by so disposing the worm and worm wheel shafts are:

(1) A greater gear or speed ratio is obtained by virtue of the fact that the pitch of the worm wheel teeth is lessened approximately 30%.

(2) Slippage between the worm and worm wheel is reduced since the worm is driven partly by a direct rotative component of the worm wheel motion.

(3) The end thrust given to both the worm shaft and the worm wheel shaft is reduced.

(4) A fairly close approximation to real gear tooth action is obtained which insures continuity of motion between the worm wheel and worm, and to an appreciable degree obviates the necessity for careful polishing and hardening of the worm which was heretofore required.

(5) Greater space is available for contact springs, and the use of a single pulsing cam which insures uniformity of pulses, is permitted.

Another feature of the invention resides in the provision of a ratchet and pawl mechanism, in which a floating pawl is provided with three substantially equi-distant supports which frictionally engage the ratchet wheel, one of said supports being situated at the free end of an elongated arm or spring member extending from the main body portion of the pawl, and so disposed relatively to the operating tooth or element of the pawl as to render possible the quiet engagement of the pawl tooth with the ratchet wheel.

The invention will be readily understood from the following detailed description made with reference to the accompanying drawings in which:

Fig. 1 is an elevation, partially in section, of a dial embodying the features of this invention.

Fig. 2 is a top plan view of the dial with the finger plate and card holder removed.

Fig. 3 is a bottom plan view showing the contact arrangement.

Fig. 4 is an enlarged top plan view with some of the parts omitted to show the relative positions of the pawl and ratchet wheel.

Fig. 5 is an enlarged section showing the angular disposition of the axes of the worm and worm wheel shafts.

Fig. 6 is a section of Fig. 4 taken along the line 6—6 and looking in the direction of the arrows.

Referring to the drawings, and particularly to Fig. 1, there is shown at 12 a cup-shaped housing or case. The case 12 is provided with a central aperture within which is rigidly secured a sleeve 10 having a cylindrical cavity passing axially therethrough. The cylindrical cavity or opening serves as a bearing for a rotatable shaft 14 which is substantially T-shape in longitudinal section and is provided with a threaded cavity at its upper end. This cavity accommodates screw 16.

The sleeve 10, at a point approximately midway of its length is provided with a collar on which is mounted a second sleeve or hub 18, which is free to rotate independently of the sleeve 10. Rigidly secured to the hub 18 is a ratchet wheel 19. The hub 18 and wheel 19 form an integral part and are free to rotate about the sleeve 10 as a unit. A pawl 20 assumes the shape of a collar provided with a circular flange having three friction supports, as clearly disclosed in Fig. 4. The diameter of the collar portion of the pawl is slightly greater than the outer diameter of the sleeve 18 so that the pawl may move clear of the sleeve. A helical spring 21 encircles the collar portion of the pawl 20, its lowermost convolution resting on the outwardly extending flange and its uppermost convolution abutting against the circular element 22 which is rigidly fitted to the top of the shaft 14. This spring 21 merely "floats" in this position and tends to keep the pawl 20 in engagement with the ratchet wheel 19 so that the tooth or active element 23 of the pawl 20 is forced into engagement with the notches or holes 24 in the ratchet wheel.

A spider or metallic element 25 of irregular formation is secured to the base of the cup-shaped support 12 by means of three screws 26, 27 and 28. The spider 25 serves as a support for one end of the worm and worm wheel shafts as will appear presently.

A bearing sleeve 30 is secured to the base of the case 12, through a central cavity of which the worm wheel shaft 31 extends. To one end of shaft 31 a pulsing cam 32 is rigidly secured in any suitable manner. The other end of shaft 31 is housed in a bearing 33 which is secured to the spider 25. The pinion 35 is integral with the shaft 31, on which the worm wheel 34 is mounted. The teeth of pinion 35 mesh with the teeth of the ratchet wheel 19 so that the motion of the latter is imparted to the worm wheel, which in turn actuates the worm 37 with which a well-known type of governor is associated.

The worm shaft 38 is angularly disposed to the worm wheel shaft 31 and is supported at one end by means of the downwardly extending portion 39 of spider 25 which accommodates the bearing 65. At its other end it is supported by means of a bearing 45 secured to the portion 40 which is cut from the base of the case 12 and bent downwardly as shown in Fig. 1. The opening made in the base of case 12 by the removal of element 40 permits the passage of the worm shaft 38 within the case.

A restoring helical spring 41 encircles the lower portion of sleeve 10 and has one end secured, in any suitable manner, to the base of the case 12 and its other end passing through a slot in the end of shaft 14 and secured thereto. When the shaft 14 is rotated the spring 41 is tensioned, its one end being fastened to the stationary case 12, so that upon the removal of the rotating force, the shaft is returned to its normal position under the recoiling action of the spring 41.

As seen in Fig. 5, the bearing 45 provides a housing for a hardened steel plug 46 having a cup-shaped seat for the ball 47. The ball 47 loosely fits its housing and is free to move therein. One end of shaft 38 is provided with an extension of smaller diameter than the main body portion thereof, which fits into a cylindrical cavity in the bearing 45 and abuts against the bearing 47. The fitting of the shaft is such as to permit a slight longitudinal thrust.

It is believed unnecessary to enter into a detailed description of the contact springs and the method of mounting them on the underside of case 12, as such equipment is well known and any suitable method of securing the contacts may be employed.

A circular number plate 48 rests upon the case 12 as shown in Fig. 1, and upon its inner edge a spring cap member 49 is supported. The upper end of shaft 14 is provided with a substantially rectangular shoulder over which the element 22 and the finger wheel 15 are fitted. The head of screw 16 overlaps the inner edge of the finger plate so that when the screw is made up on the shaft 14 the finger plate 15 and the element 22 are rigidly secured to the shaft. The element 22 is provided with two extensions which, when the dial is assembled, are recessed in the apertures 80 in pawl 20.

When the finger dial is rotated in the usual manner, the shaft 14 rotates against the restraining force exerted by spring 41. Pawl 20 being secured to the element 22 rotates correspondingly, its friction supports 51, 52 and 53 (Fig. 4) sliding over the ratchet wheel 13 which remains stationary during this movement of the finger plate. When the finger wheel is stopped the tooth 23 of pawl 25 engages the edge of one of the ratchet holes 24 in ratchet wheel 13, so that when the finger plate is released and returns to normal under the action of spring 41 the ratchet wheel 13 is rotated through an arc corresponding to the arc traveled by the finger plate on its return movement. It will be noted that the spring action of the elongated arm 60 tends to cushion the dropping of the pawl tooth into the ratchet holes thereby rendering this engagement substantially noiseless. The objectionable metallic clicking which heretofore characterized the engagement of the pawl tooth with the ratchet notches has been minimized appreciably accordingly. The movement of the ratchet wheel 13 is imparted to the worm wheel 34 by means of the gear 35 so that the pulsing cam 32 is rotated and causes the pulsing spring 55 to be actuated to effect the transmission of pulses in the well-known manner. The worm wheel being in mesh with the worm causes the governor to function to insure a steady regulated series of pulses.

Though applicant has disclosed a new type of ratchet and pawl mechanism, it is to be understood that the satisfactory functioning of this dial is not dependent upon its exclusive use. The remaining portion of applicant's dial will function satisfactorily with any of the well known dial ratchet mechanisms now in use.

It will be noted that the spider 25 provides a stop 58 so that the pawl 20 cannot ride beyond its normal position. When the pawl reaches its normal position the stop 58 abuts against the raised portion of the tooth or operating element 23 of the pawl, preventing any further movement.

What is claimed is:

1. In an impulse transmitting device, a rotatable finger wheel, a ratchet and pawl mechanism, said pawl having a plurality of friction supports engaging said ratchet, a pawl tooth in juxtaposition with one of said friction supports and limited in its tendency to engage said ratchet by said support, pulsing contacts, and means cooperating with said ratchet and pawl mechanism for actuating said pulsing contacts in response to a movement of said rotatable finger wheel.

2. In an impulse transmitting device, a rotatable finger wheel, a ratchet and pawl mechanism, said pawl having a plurality of friction supports engaging said ratchet, one of said supports being located at the end of an elongated arm extending from the main body portion of said pawl, a pawl tooth in juxtaposition with the support on said elongated spring arm and limited thereby in its tendency to engage said ratchet, pulsing contacts and means cooperating with said ratchet and pawl mechanism for actuating said pulsing contacts in response to a movement of said rotatable finger wheel.

3. In an impulse transmitting device, a rotatable finger wheel, a ratchet and pawl mechanism, said pawl having friction supports associated with the main body portion thereof and engaging said ratchet, a pawl tooth extending from the main body portion of said pawl and located substantially equidistant from said friction supports, an elongated arm integral with the main body portion of said pawl for limiting the engagement of said pawl tooth with said ratchet, said arm extending from said pawl at a point adjacent one of said friction supports and terminating in another friction support at a point adjacent said pawl tooth, pulsing contacts and means cooperating with said ratchet and pawl mechanism for actuating said pulsing contacts in response to a movement of said rotatable finger wheel.

4. In an impulse transmitting device, a rotatable dial, a ratchet and pawl mechanism for setting said dial, a governor for regulating the speed of rotation of said dial after the setting thereof and a worm and worm-wheel mechanism for actuating said governor, the axes of the shafts of said worm and worm-wheel being disposed at an angle other than 90 degrees.

5. In an impulse transmitting device, a rotatable finger wheel, a ratchet and pawl mechanism, said pawl having a plurality of friction supports engaging said ratchet, a pawl tooth in juxtaposition with one of said friction supports and limited in its tendency to engage said ratchet by said support, pulsing contacts, means cooperating with said ratchet and pawl mechanism for actuating said pulsing contacts in response to a return movement of said rotatable finger wheel and a governor for regulating the speed of rotation of said finger wheel during its return movement.

6. In an impulse transmitting device, a rotatable dial, a ratchet and pawl mechanism, said ratchet embodying means for effecting the noiseless association of said pawl with said ratchet, pulsing contacts and means cooperating with said ratchet and pawl mechanism for actuating said pulsing contacts in response to a movement of said rotatable dial.

In witness whereof, I hereunto subscribe my name this 24th day of January, 1929.

HAROLD W. GOFF.